US010343929B2

(12) United States Patent
Maurer et al.

(10) Patent No.: US 10,343,929 B2
(45) Date of Patent: *Jul. 9, 2019

(54) PROCESS FOR OBTAINING PRECIPITATED CALCIUM CARBONATE

(71) Applicant: Omya International AG, Oftringen (CH)

(72) Inventors: Marc Maurer, Village-Neuf (FR); Thomas Schlotterbach, Villach-St. Magdalen (AT); Mathieu Skrzypczak, Terrace Park, OH (US); Robert Pirker, Bleiberg-Kreuth (AT)

(73) Assignee: Omya International AG, Oftringen (CH)

( * ) Notice: Subject to any disclaimer, the term of this patent is extended or adjusted under 35 U.S.C. 154(b) by 122 days.

This patent is subject to a terminal disclaimer.

(21) Appl. No.: 15/417,578

(22) Filed: Jan. 27, 2017

(65) Prior Publication Data

US 2017/0137299 A1    May 18, 2017

Related U.S. Application Data

(62) Division of application No. 14/907,734, filed as application No. PCT/EP2014/067075 on Aug. 8, 2014, now Pat. No. 9,776,884.

(30) Foreign Application Priority Data

Aug. 20, 2013 (EP) ..................... 13181073

(51) Int. Cl.
*C01F 11/18* (2006.01)
*C09C 1/02* (2006.01)

(52) U.S. Cl.
CPC .......... *C01F 11/182* (2013.01); *C01F 11/181* (2013.01); *C01F 11/187* (2013.01); *C09C 1/021* (2013.01); *C01P 2004/51* (2013.01); *C01P 2006/12* (2013.01); *C01P 2006/80* (2013.01)

(58) Field of Classification Search
CPC .................................................... C01F 11/182
See application file for complete search history.

(56) References Cited

U.S. PATENT DOCUMENTS

| 5,833,747 | A |   | 11/1998 | Bleakley et al. |
| 6,156,286 | A | * | 12/2000 | Fortier ................ C01F 11/181 423/432 |
| 8,999,284 | B2 |   | 4/2015 | Pohl et al. |
| 9,725,329 | B2 |   | 8/2017 | Pohl et al. |

FOREIGN PATENT DOCUMENTS

| EP | 0768344 A2 | 4/1997 |
| GB | 941900 | 8/1961 |
| GB | 2145074 A | 3/1985 |
| JP | 5116936 | 2/1976 |
| JP | 59223225 A | 12/1984 |
| JP | 63260815 A | 10/1988 |
| JP | 1018911 A | 1/1998 |
| WO | 2011/121065 A1 | 10/2011 |
| WO | 2011121085 A1 | 10/2011 |
| WO | 2012175490 A1 | 12/2012 |

OTHER PUBLICATIONS

EP Search Report dated Jan. 30, 2014 for EP 13181073.1.
Office Action dated Jun. 15, 2016 for AU 2014310798.
Office Action dated Nov. 18, 2015 for TW 103124659.
Office Action dated Nov. 16, 2106 for CA 2,920,701.
Office Action dated Aug. 19, 2016 for CN 201480046172.0.
Extended Search Report dated May 21, 2014 for EP 13181073.1.
International Preliminary Report on Patentability dated Mar. 3, 2016 for PCT/EP2014/067075.
WO Search Report and Written Opinion dated Oct. 24, 2014 for PCT/EP2014/067075.
International Search Report dated Jan. 20, 215 for PCT/EP2014/067075.
Written Opinion of the International Searching Authority dated Jan. 20, 215 for PCT/EP2014/067075.
Tube Press: Metso Corporation, Jan. 2, 2012 pp. 1-8, XP055096929.
Office Action dated Jun. 26, 2018 for Indian Application No. 201627003694.
Office Action dated Oct. 20, 2017 for Korean Application No. 10-2016-7005747.
Office Action dated Oct. 20, 2017 for Russian Application No. 2016109610.

* cited by examiner

*Primary Examiner* — Stuart L Hendrickson
(74) *Attorney, Agent, or Firm* — Amster, Rothstein & Ebenstein LLP

(57) ABSTRACT

The present invention provides a process for preparing a precipitated calcium carbonate product comprising the steps of: (a) preparing an aqueous suspension of precipitated calcium carbonate seeds by carbonating a suspension of $Ca(OH)_2$ in the presence of 0.005 to 0.030 moles of Sr, in the form of $Sr(OH)_2$, per mole of $Ca(OH)_2$, (b) dewatering and dispersing the precipitated calcium carbonate seeds prepared in step (a) to obtain an aqueous suspension of precipitated calcium carbonate seeds having a $d_{50}$ of less than or equal to 0.1 to 0.3 μm and a BET specific surface area of 10 to 30 $m^2/g$, and (c) forming an aqueous suspension of a precipitated calcium carbonate product by carbonating a slurry of $Ca(OH)_2$ in the presence of 0.5 to 5% by dry weight of the precipitated calcium carbonate seeds obtained in step (b), wherein the precipitated calcium carbonate seeds have a $d_{50}$ that is less than the $d_{50}$ of the precipitated calcium carbonate product and the precipitated calcium carbonate seeds have an aragonitic polymorph content greater than or equal to the precipitated calcium carbonate product obtained in step (c) characterized in that the dewatering of step (b) is carried out by the use of a tube press.

19 Claims, 2 Drawing Sheets

PROCESS FOR OBTAINING PRECIPITATED CALCIUM CARBONATE

CROSS-REFERENCE TO RELATED APPLICATIONS

Figure 1:
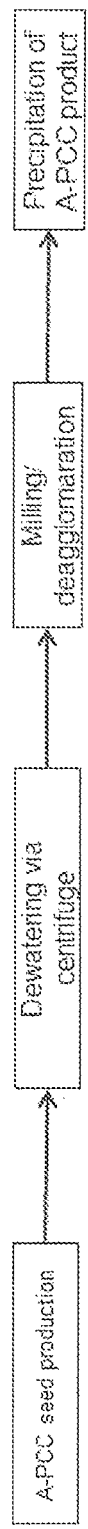

This is a divisional of U.S. application Ser. No. 14/907,734, filed Jan. 26, 2016, which is a U.S. National Phase of PCT Application No. PCT/EP2014/067075, filed Aug. 8, 2014, which claims priority to European Application No. 13181073.1, filed Aug. 20, 2013, the contents of which are hereby incorporated by reference.

FIELD OF THE INVENTION

The present invention relates to a method for producing a precipitated calcium carbonate and, in particular, a precipitated calcium carbonate product having an increased weight percent of the aragonitic crystal polymorph.

BACKGROUND OF THE INVENTION

In recent years calcium carbonate has found a wide array of uses across many fields. For example, calcium carbonate is one of the most widely used minerals in the paper, plastic, paint and coating industries both as a filler and, due to its white color, as a coating pigment. In the paper industry calcium carbonate is valued for its high brightness, opacity and gloss and is commonly used as a filler to make bright opaque paper. In addition, calcium carbonate is frequently used as an extender in paints and is also used as a filler in adhesives and sealants. High grade calcium carbonate has also found uses in formulations of pharmaceuticals.

Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable.

Among these three forms, aragonite is particularly useful in a number of applications, such as an inorganic filler or paper coating, and due to its needle-shaped crystal structure it offers enhanced paper bulk and opacity. As a result, the demand for calcium carbonate with a significant aragonite crystal content has increased substantially.

Generally, one way to produce calcium carbonate commercially is by calcining crude calcium carbonate to obtain quicklime. Water is then added to yield an aqueous suspension of calcium hydroxide ("milk of lime"), and carbon dioxide is reintroduced into this slurry to precipitate the calcium carbonate. The product of this process is known as precipitated calcium carbonate ("PCC"). The resulting aqueous suspension, or slurry, of calcium carbonate may be used as is or further processed (i.e. dewatered, ground etc.) to form a dry product. The precipitation reaction is capable of producing each of the three polymorphs (calcite, aragonite and vaterite) depending on the exact reaction conditions used.

Prior art processes for producing a PCC product with an increased aragonitic crystal content have generally taken a number of approaches. In a first approach, processes have been developed which use additives, such as strontium salts, to promote the production of the aragonitic crystal during carbonation resulting in the formation of PCC. For example, GB 2145074A discloses a process for producing a precipitated aragonite calcium carbonate product by adding strontium chloride ($SrCl_2$) during carbonation to act as an agent in the formation of aragonite crystals. The use of strontium compounds as additives to the carbonation process for preparing PCC is also disclosed in the PCC production processes of the following Japanese Patent Publications: JP63260815, JP59223225, JP5116936 and JP1018911.

In a second approach, processes have utilized aragonite seed crystals to increase aragonite crystal formation. For instance, GB 941900A teaches a process for producing aragonitic calcium carbonate by introducing a sodium carbonate solution during carbonation. The reference suggests that the addition of aragonite seed crystals, to the disclosed process, may accelerate the production of aragonite crystals.

The production processes discussed above have been shown to increase marginally the total aragonitic crystal content of the PCC product. However, these processes have generally been unable to produce PCC having a total aragonitic content of greater than 60%.

EP 0 768 344 A2 describes a method for the preparation of a precipitated calcium carbonate for use as a pigment in paper coating companions. The method comprises the steps of (a) carbonating an aqueous lime-containing medium to produce an aqueous suspension of a precipitated calcium carbonate predominantly in a selected crystal form, (b) at least partially dewatering the PCC-containing suspension, and (c) subjecting the PCC-containing suspension to comminution by high shear attrition grinding with an attrition grinding medium.

Finally, the Applicant draws the attention to her own patent application WO 2011/121065 that also discloses the use of aragonite seed crystals to increase aragonite crystal formation. After the formation of the aragonite seed crystals, the aqueous suspension of seeds is subjected to a post-treatment consisting of a dewatering and grinding step before the seeds are used for the formation of the aragonite PCC end product. However, the use of a grinding step is high in energy consumption and hence makes the production of the aragonitic PCC product expensive.

Accordingly, there still exists a need for a low cost process for producing precipitated PCC containing increased amounts of the aragonitic polymorph.

BRIEF SUMMARY OF THE INVENTION

The present invention provides a process of producing a low cost PCC-comprising material, wherein greater than 60%, and preferably greater than 70%, relative to the PCC in the PCC-comprising material, is of the aragonitic polymorph. In its general form, the present invention accomplishes these requirements by utilizing a three stage manufacturing process. In the first stage, an aqueous suspension of precipitated calcium carbonate seeds may be formed by carbonating a suspension of $Ca(OH)_2$ in the presence of 0.005 to 0.030, or more preferably, 0.01 to 0.02, moles of strontium, in the form of $Sr(OH)_2$, per mole of $Ca(OH)_2$ prior to carbonation. In the second stage, the precipitated calcium carbonate seeds prepared in step (a) are dewatered and dispersed to obtain an aqueous suspension of precipitated calcium carbonate seeds having a $d_{50}$ of less than or equal to 0.1 to 0.3 μm and a BET specific surface area of 10 to 30 m²/g. The dewatering is carried out by the use of a tube press. In the third stage, an aqueous suspension of a precipitated calcium carbonate product may be formed by carbonating a slurry of $Ca(OH)_2$ in the presence of 0.5 to 5% by dry weight of the precipitated calcium carbonate seeds obtained in step (b). The precipitated calcium carbonate seeds may have a $d_{50}$ that is less than the $d_{50}$ of the precipitated calcium carbonate product and the precipitated calcium carbonate seeds may have an aragonitic polymorph content greater than or equal to the precipitated calcium carbonate product. As will be discussed in the examples below, the product of this three stage process overcomes the deficiencies of prior PCC production processes and yields the desired increase in the total weight percent of the aragonitic polymorph within the final product.

The present invention also provides an aqueous suspension of precipitated calcium carbonate seeds obtained after step (b) of the process of the invention, the suspension having a pH of less than or equal to 9, preferably in the range of 8.5 to 9.

In addition, the present invention provides a material comprising the precipitated calcium carbonate product of the present invention. The material may include, for example, products in which it is desirable to include calcium carbonate as a filler or as a coating pigment, such as paper, paper products, inks, paints, coatings, plastics or polymers, adhesives, building products, foodstuffs, and pharmaceutical products. Finally, the precipitated calcium carbonate product of the present invention is directed to uses of the product for the manufacture of a material in which it is desirable to use aragonitic PCC (A-PCC) as a filler or as a coating pigment.

Last but not least, the present invention also provides the use of a tube press in the process for preparing a precipitated calcium carbonate product of the present invention.

Additional objects of the invention will be apparent from the description which follows.

DRAWINGS

FIG. 1 is a diagram showing briefly the process route of the prior art for the production of an A-PCC product. According to this prior art process after the A-PCC seed production the A-PCC seeds are dewatered via a centrifuge and then are subjected to a milling and de-agglomeration step. Then, in a further step, the milled and de-agglomerated A-PCC seed is used for the precipitation of the A-PCC product.

Figure 2:
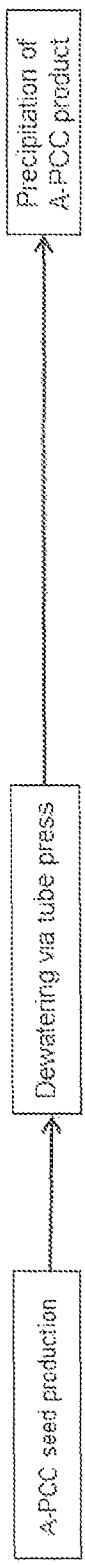

FIG. 2 is a diagram showing briefly the process route according to the present invention for the production of an A-PCC product. According to the process of the invention, the A-PCC seeds are only subjected to a dewatering step by a tube press. Then, in a further step, the dewatered A-PCC seed is used for the precipitation of the A-PCC product by carbonation of calcium hydroxide slurry with gaseous $CO_2$ in the presence of the A-PCC seeds.

DETAILED DESCRIPTION OF THE INVENTION

As discussed above, PCC is typically manufactured through the carbonation of hydrated lime. In this process, crushed calcium carbonate is first calcined (heated) to form lime (CaO) and carbon dioxide gas ($CO_2$). This reaction is shown in reaction (1):

The lime is then slaked with water to form calcium hydroxide ($Ca(OH)_2$), or milk of lime, which is shown in reaction (2):

Finally, the calcium hydroxide is combined with carbon dioxide (usually captured during the calcining step) to precipitate calcium carbonate. This carbonation step is shown in reaction (3):

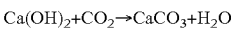

In accordance with the present invention, a precipitated calcium carbonate product is prepared in a three-stage process. In the first stage, an aqueous suspension (or slurry) of precipitated calcium carbonate seeds is prepared by carbonating a suspension of $Ca(OH)_2$ in the presence of 0.005 to 0.030, or more preferably, 0.01 to 0.02 moles of strontium, in the form of $Sr(OH)_2$, based upon moles of $Ca(OH)_2$ prior to carbonation. The $Sr(OH)_2$ may be introduced via the lime of the suspension of $Ca(OH)_2$ or, more preferably, may be formed in situ by the addition of SrO—comprising minerals during slaking and/or carbonation. Where $Sr(OH)_2$ is formed in situ by the addition of SrO—comprising minerals, the SrO—comprising mineral may be obtained, preferably, by calcining $SrCO_3$—comprising minerals or crude strontianite raw stones.

The precipitated calcium carbonate seeds of the present invention are characterized by an aragonitic polymorph content greater than or equal to the aragonitic polymorph content of the precipitated calcium carbonate product produced in the second stage. Specifically, in the process of the present invention, the aqueous solution of precipitated calcium carbonate seeds may have an aragonitic polymorph content of greater than 85%, preferably, 90% or, most preferably, 95% by dry weight. The dry weight percent, as described herein, is determined by x-ray diffraction analysis (XRD).

The precipitated calcium carbonate seeds produced during the first stage of the manufacturing process are further characterized by a weight median particle size $d_{50}$ that is less than the weight median particle size $d_{50}$ of the precipitated calcium carbonate product. Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For determining the weight median particle size $d_{50}$ value, a Sedigraph™ 5100 device from the company Micromeritics, USA can be used.

In the second stage, the precipitated calcium carbonate seeds prepared in step (a) are dewatered and dispersed to obtain an aqueous suspension of precipitated calcium carbonate seeds having a $d_{50}$ of less than or equal to 0.1 to 0.3 µm and a BET specific surface area of 10 to 30 m²/g. The BET specific surface area (also designated as SSA) was determined according to ISO 9277 using a Tristar II 3020 sold by the company MICROMERITICS™ and measuring the nitrogen absorption according to the BET procedure on a dried sample.

The dewatering in this step is carried out by a tube press. A tube press is a membrane type filter press and capable of operating at high filtration pressures up to 100 bar or higher. The use of these high pressures enables a higher degree of separation of the liquid and solid phases. The principles of operation of a tube press are as follows:

The filtration takes place between two concentric cylinders. The outer cylinder is the casing, and the inner, the candle. The process slurry is pumped into the annular space between the filter medium and the bladder. Hydraulic fluid, usually water, is then pumped between the bladder and the casing putting the slurry under pressure and causing filtration to take place. When filtration is complete the hydraulic fluid is withdrawn from the tube unit using vacuum until the bladder is dilated against the casing. The candle is then lowered to the discharge position and a pulse of air is blown between the candle and the filter medium. This causes the filter cloth to expand, fracturing the cake which is discharged under gravity. When complete the candle closes to the slurry fill position to repeat the cycle.

Compared to the process described in document WO 2011/121065 and using a dewatering step in combination with a grinding step, the present process which uses only a dewatering by the use of a tube press has the following advantages:

First of all there is a saving of the costs because the present process does not make use of the energy intensive grinding step.

Another reason is that the grinding step in WO 2011/121065 is used to deagglomerate the obtained aragonitic PCC crystals which were obtained after the carbonation reaction in the form of agglomerates. However, the grinding of the PCC crystals tends to release lime that is entrapped within the agglomerate as a constituent of the PCC leading to an increase of the viscosity of the suspension of PCC and to an increase in the pH. The latter, i.e. the pH increase, is in particular unwanted when the final product should be applied in the paper making industry. The inventors of the present invention have surprisingly found out that the drawback that is associated with the use of a grinding step can be eliminated by the use of a tube press and at the same time to obtain deagglomerated aragonitic PCC crystals.

The dewatering of step (b) is carried out under a pressure in the range of 50 to 150 bar, preferably under a pressure in the range of 60 to 120 bar, and most preferably under a pressure in the range of 80 to 100 bar.

The starting temperature of the dewatering is in the range of 15 to 80° C., preferably at a starting temperature in the range of 20 to 70° C., and more preferably at a starting temperature in the range of 30 to 60° C.

The product obtained after the dewatering, usually a cake, has preferably a solids content in the range 60 to 85%, based on the weight of the cake.

After the dewatering, the obtained aragonitc PCC cake is dispersed by the use of common dispersing agents to obtain an aqueous suspension of precipitated calcium carbonate seeds having a $d_{50}$ of less than or equal to 0.1 to 0.3 µm and a BET specific surface area of 10 to 30 $m^2/g$, which is used in the third stage of the present process. Preferred dispersing agents are based on polyacrylic acid. The dispersing can be performed by the use of any suitable means, and is preferably conducted by the use of a high sheer disperser.

The aqueous suspension of precipitated calcium carbonate seeds obtained after step (b), i.e. after the dewatering and dispersion has a pH of less or equal to 9, and preferably in the range of 8.5 to 9.

In the third stage of the process of the present invention, an aqueous suspension of a precipitated calcium carbonate product is formed by carbonating a slurry of $Ca(OH)_2$ in the presence of 0.5 to 5% by dry weight of the precipitated calcium carbonate seeds obtained from the first stage of the production process. In this regard, the precipitated calcium carbonate seeds may be added to the slurry of $Ca(OH)_2$ prior to carbonation of the precipitated calcium carbonate product. Alternatively, the precipitated calcium carbonate seeds may be added to the slurry of $Ca(OH)_2$ within the first quarter of the total carbonation time. In the meaning of the present invention the total carbonation time is meant to encompass the period from the start of the carbonation process until the point of the carbonation reaction where the measured electrical conductivity of the reaction mixture reaches a minimum.

The process described herein is capable of producing a precipitated calcium carbonate product which contains an aragonitic polymorph content of greater than 60% by dry weight and, preferably, greater than 70% by dry weight as determined by XRD analysis. In addition, the precipitated calcium carbonate product produced in the second stage, preferably, has a total strontium quantity of 1 to 5 mol/dry metric tonne.

It is also within the confines of the present invention that the precipitated calcium carbonate product obtained in the third stage may be subjected to further dewatering and dispersion steps to obtain a precipitated calcium carbonate product having the desired characteristics. Preferably, the precipitated calcium carbonate product obtained in the third stage may be subjected to additional processing to obtain a weight median particle size $d_{50}$ of between 0.30 and 0.45 µm and a BET SSA of between 8 and 20 $m^2/g$.

Finally, the aragonitic precipitated calcium carbonate product produced according to the present invention may be used in various materials in which it is desirable to use calcium carbonate as a filler or as a coating pigment. For example, the aragonitic precipitated calcium carbonate product may be used in the pharmaceutical field with products such as medicines, in human or animal foodstuffs, in the papermaking field such as a filler or coating of paper, in water-based or non-water-based paints, in plastics or polymers, or in printing inks (e.g. offset printing, flexographic and rotogravure printing).

Table 1 shows a comparison of properties of the products obtained by the present invention as compared to those obtained using the prior art process.

|  |  |  | Example | | | | |
|---|---|---|---|---|---|---|---|
|  |  |  | Comp. Ex. 1 PA | Comp. Ex. 2 PA | Ex. 1 IN | Ex. 2 IN | Ex. 3 IN |
| A-PCC Seed | Carbonation | $Sr(OH)_2 \cdot 8H_2O$ [wt.-%] | 5.0 | 5.0 | 5.0 | 5.0 | 5.0 |
|  |  | SSA [$m^2/g$] | 15.6 | 13.7 | 14.9 | 13.7 | 17.3 |
|  |  | $d_{50}$ [µm] | 1.17 | 0.99 | 0.91 | 0.99 | 1.02 |
|  |  | Aragonite [%] | 97.4 | 98.2 | 98.5 | 98.2 | 98.7 |
|  | Post-processing | SSA [$m^2/g$] | 26.6 | 22.3 | 20.5 | 18.2 | 23.3 |
|  |  | $d_{50}$ [µm] | 0.22 | 0.21 | 0.21 | 0.21 | 0.21 |
| A-PCC Product | Carbonation | A-PCC seed [wt.-%] | 1.5 | 1.0 | 1.5 | 1.0 | 1.0 |
|  |  | SSA [$m^2/g$] | 9.2 | 8.0 | 9.2 | 9.4 | 9.5 |
|  |  | $d_{50}$ [µm] | 1.37 | 1.37 | 1.21 | 1.22 | 1.12 |
|  |  | Aragonite [%] | 86.1 | 88.1 | 87.3 | 83.8 | 92.0 |

-continued

|  |  | Example | | | | |
|---|---|---|---|---|---|---|
|  |  | Comp. Ex. 1 PA | Comp. Ex. 2 PA | Ex. 1 IN | Ex. 2 IN | Ex. 3 IN |
| Post-processing | SSA [m²/g] | 13.1 | 11.6 | 12.4 | 9.6 | 14.1 |
|  | d$_{50}$ [µm] | 0.36 | 0.34 | 0.37 | 0.42 | 0.31 |

IN = Invention/PA = Prior art

EXAMPLES

Measurement Methods:
pH Measurement

The pH is measured at 25° C. using a Mettler Toledo Seven Easy pH meter and a Mettler Toledo InLab® Expert Pro pH electrode. A three point calibration (according to the segment method) of the instrument is first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 seconds).

BET Specific Surface Area (SSA)

The BET specific surface area (also designated as SSA) was determined according to ISO 9277 using a Tristar II 3020 sold by the company MICROMERITICS'.

Particle Size Distribution (Mass % Particles with a Diameter<x µm) and Weight Median Particle Diameter (d$_{50}$) of Particulate Material (d$_{50}$ (µm))

Sedigraph™ 5100

The weight median particle diameter and the particle diameter mass distribution of a particulate material were determined via the sedimentation method, i.e. an analysis of sedimentation behavior in a gravimetric field. The measurement is made with a Sedigraph™ 5120 sold by the company MICROMERITICS'.

The method and the instrument are known to the skilled person and are commonly used to determine particle size of fillers and pigments. The measurement is carried out in an aqueous solution of 0.1% by weight of $Na_4P_2O_7$. The samples were dispersed using a high speed stirrer and ultrasonic.

Weight Solids (% by Weight) of a Material in Suspension

The weight solids (also called solids content of a material) were determined by dividing the weight of the solid material by the total weight of the aqueous suspension. The weight solids content was determined at 160° C. using a Moisture Analyzer MJ 33 from Mettler Toledo.

The weight of the solid material was determined by weighing the solid material obtained by evaporating the aqueous phase of the suspension and drying the obtained material to a constant weight.

COMPARATIVE EXAMPLES

Comparative Example 1

Stage 1: A-PCC Seed 200 kg of quicklime CaO (supplied by Tagger Lime, Golling, Austria) was slaked by adding the compound to 1 400 liters [Surely not 1.4(00) liters.] of 50° C. tap water in a stirred reactor. The quicklime was slaked for 30 minutes under continuous stirring and the resulting slurry of calcium hydroxide ("milk of lime") was adjusted to 14% solids content via dilution with 60° C. water and was then screened on a 100 µm screen.

The A-PCC seed precipitation was conducted in a 2 000 liter baffled cylindrical stainless steel reactor equipped with a gassing agitator, a stainless steel carbonation tube to direct a carbon dioxide/air gas stream to the impeller and probes for monitoring the pH and conductivity of the suspension. 1 600 liters of the calcium hydroxide suspension obtained in the slaking step above, adjusted to a temperature of 60° C., was added to the carbonating reactor. Then 5.0% by weight of $Sr(OH)_2 \cdot 8H_2O$ (based on the dry weight of calcium hydroxide) was added to the milk of lime prior to carbonation. A gas of 20% by volume of $CO_2$ in air was then bubbled upwards through the slurry at a rate of 200 m³/h under a slurry agitation of 240 rpm. The $CO_2$ volume fraction and gas flow rate were maintained at this rate until the end of the reaction. During the carbonation, the temperature of the reaction mix was not controlled and was allowed to rise due to the heat generated in the exothermic precipitation reaction. After conductivity reached a minimum, corresponding to the total conversion of $Ca(OH)_2$ into PCC, the gassing was continued for another 10 minutes before the introduction of gas was stopped. Carbonation time, calculated from start of gas introduction to the time of minimum conductivity, was 84 minutes. The A-PCC seed slurry was then screened on a 45 µm screen, and the screened product was recovered as an aqueous slurry of the A-PCC seed. The A-PCC seed carbonation with the addition of 5.0% by weight of $Sr(OH)_2 \cdot 8H_2O$ yielded an A-PCC seed slurry having 97.4% aragonite and a pH of 10.

A post processing of the A-PCC seed slurry was conducted. In particular, the material was dewatered and ground to yield particles having an SSA of 26.6 m²/g and a median diameter d$_{50}$ of 0.22 µm.

Stage 2: A-PCC Product

Slaking and carbonation were performed in the same manner as described in Stage 1 above, except that no $Sr(OH)_2 \cdot 8H_2O$ was added and 1.5% by weight (calculated as dry calcium carbonate based on dry weight of calcium hydroxide) of the ground A-PCC seed formed in Stage 1 was added to the milk of lime prior to carbonation. Testing conducted on the final A-PCC product indicated that 86.1% of the product was of the aragonitic crystal. In addition, post processing was conducted by the use of a tube press to yield particles having an SSA of 13.1 m²/g and a median diameter d$_{50}$ of 0.36 µm.

Comparative Example 2

Stage 1: A-PCC Seed

Comparative Example 2 differs from Comparative Example 1 only in the used quicklime. In this example 200 kg of quicklime from the company Mississippi Lime Co., Ste. Genevieve, Mo., was used.

The slaking and carbonation of the quicklime were performed in the same manner as described in Stage 1 of the Comparative Example 1.

A post processing of the A-PCC seed slurry was conducted. In particular, the material was dewatered and grinded to yield particles having an SSA of 22.3 m$^2$/g and a median diameter d$_{50}$ of 0.21 µm.

Stage 2: A-PCC Product

Slaking and carbonation were performed in the same manner as described for Stage 2 in Comparative Example 1, with the exception that 1.0% by weight of the grinded A-PCC seeds formed in Stage 1 were added to the milk of lime prior to carbonation. Testing conducted on the final A-PCC product indicated that 87.7% of the product was of the aragonitic crystal. In addition, post processing was conducted by the use of a tube press to yield particles having an SSA of 11.6 m$^2$/g and a median diameter d$_{50}$ of 0.34 µm.

INVENTIVE EXAMPLES

Example 1

Stage 1: A-PCC Seed

Slaking and carbonation were performed in the same manner as described in Stage 1 above of the Comparative Example 1.

Stage 2: Post-Processing

The post processing of the A-PCC seed slurry was conducted in the following way: About 0.3 m$^3$ of the suspension obtained in stage 1 were transferred to a tube press of the 500 SC series from Metso Minerals.

The tube press settings were as follows:
Slurry feed pressure: 9 bar
Low pressure: 20 bar
Low pressure time: 120 sec
High pressure: 100 bar
High pressure time: 60 sec
Filling temperature: 31° C.

The cake obtained after the dewatering with the tube press showed a solids content of 68% by weight.

Then, the cake was redispersed using 1.3% by weight of a common polyacrylic based dispersing agent with the use of a high sheer disperser. The obtained particles had an SSA of 20.5 m$^2$/g, a median diameter d$_{50}$ of 0.21 µm and a pH of 8.9.

Stage 3: A-PCC Product

Slaking and carbonation were performed in the same manner as described in Stage 2 of Comparative Example 1, except that no Sr(OH)$_2$.8H$_2$O was added and 1.5% by weight (calculated as dry calcium carbonate based on dry weight of calcium hydroxide) of the A-PCC seed formed in Stage 2 was added to the milk of lime prior to carbonation. Testing conducted on the final A-PCC product indicated that 87.3 8% of the product was of the aragonitic crystal form.

Although not required, in this example, post processing of the A-PCC seed slurry was conducted in the same way as described in Stage 2 above. The obtained particles had an SSA of 12.4 m$^2$/g and a median diameter d$_{50}$ of 0.37 µm.

Example 2

Stage 1: A-PCC Seed

Slaking and carbonation were performed in the same manner as described in Stage 1 of the Comparative Example 1. The only difference was the used type of lime, which was quicklime from the company Mississippi Lime Co., Ste. Genevieve, Mo. The A-PCC seed carbonation yielded an A-PCC seed slurry having an aragonite content of 98.2%.

Stage 2: Post-Processing

The post processing of the A-PCC seed slurry was conducted in the same way as described in Step 2 of Example 1.

The obtained particles had an SSA of 18.2 m$^2$/g and a median diameter d$_{50}$ of 0.21 µm.

Stage 3: A-PCC Product

Slaking and carbonation were performed in the same manner as described in Stage 1 of Example 1, except that 1.0% by weight (calculated as dry calcium carbonate based on dry weight of calcium hydroxide) of the A-PCC seed formed in Stage 2 was added to the milk of lime prior to carbonation. Testing conducted on the final A-PCC product indicated that 83.8% of the product was of the aragonitic crystal form.

Although not required, in this example, post processing of the A-PCC seed slurry was conducted in the same way as described in Stage 2 of Comparative Example 1. The obtained particles had an SSA of 9.6 m$^2$/g and a median diameter d$_{50}$ of 0.42 µm.

Example 3

Example 3 differs from Example 2 only in the used product, which is CaO from the company Graymont Inc., Superior Wis.

The properties for any one of the products obtained in Comparative Examples 1 and 2 as well as in Examples 1 to 3 can be derived from Table 1.

Now that various embodiments of the present invention have been described in detail, various modifications and improvements thereon will become readily apparent to those skilled in the art. The present embodiments are therefore to be considered in all respects as illustrative and not restrictive, the scope of the invention being indicated by the appended claims, and all changes that come within the meaning and range of equivalency of the claims are therefore intended to be embraced therein.

The invention claimed is:

1. An aqueous suspension of precipitated calcium carbonate seeds having a pH of less than or equal to 9, wherein the aqueous suspension is obtained by a process comprising the steps of:
    (a) preparing an aqueous suspension of precipitated calcium carbonate seeds by carbonating a suspension of Ca(OH)$_2$ in the presence of 0.005 to 0.030 moles of Sr, in the form of Sr(OH)$_2$, per mole of Ca(OH)$_2$, and
    (b) dewatering and dispersing the precipitated calcium carbonate seeds prepared in step (a) to obtain an aqueous suspension of precipitated calcium carbonate seeds having a d$_{50}$ of less than or equal to 0.1 to 0.3 µm and a BET specific surface area of 10 to 30 m$^2$/g, and a pH of less than or equal to 9, wherein the precipitated calcium carbonate seeds comprise strontium, and wherein the dewatering is carried out by the use of a tube press.

2. The aqueous suspension of claim 1, having a pH of 8.5 to 9.

3. The aqueous suspension according to claim 1, wherein the suspension of Ca(OH)$_2$ in step (a) is carbonated in the presence of 0.01 to 0.02 moles of Sr per mole of Ca(OH)$_2$.

4. The aqueous suspension according to claim 1, wherein the Sr(OH)$_2$ in step (a) is formed in situ by the addition of a SrO—comprising mineral.

5. The aqueous suspension according to claim 1, wherein the aqueous suspension of precipitated calcium carbonate seeds formed in step (a) has an aragonitic polymorph content of greater than 85% by dry weight.

6. The aqueous suspension according to claim 1, wherein the aqueous suspension of precipitated calcium carbonate seeds formed in step (a) has an aragonitic polymorph content of greater than 90% by dry weight.

7. The aqueous suspension according to claim 1, wherein the aqueous suspension of precipitated calcium carbonate seeds formed in step (a) has an aragonitic polymorph content of greater than 95% by dry weight.

8. The aqueous suspension according to claim 1, wherein the dewatering of step (b) is carried out under a pressure in the range of 50 to 150 bar.

9. The aqueous suspension according to claim 1, wherein the dewatering of step (b) is carried out under a pressure in the range of 60 to 120 bar.

10. The aqueous suspension according to claim 1, wherein the dewatering of step (b) is carried out under a pressure in the range of 80 to 100 bar.

11. The aqueous suspension according to claim 1, wherein the dewatering of step (b) is carried out at a starting temperature in the range of 15 to 80° C.

12. The aqueous suspension according to claim 1, wherein the dewatering of step (b) is carried out at a starting temperature in the range of 20 to 70° C.

13. The aqueous suspension according to claim 1, wherein the dewatering of step (b) is carried out at a starting temperature in the range of 30 to 60° C.

14. A material comprising the precipitated calcium carbonate product obtained in the process comprising the steps of:
   (a) preparing an aqueous suspension of precipitated calcium carbonate seeds by carbonating a suspension of $Ca(OH)_2$ in the presence of 0.005 to 0.030 moles of Sr, in the form of $Sr(OH)_2$, per mole of $Ca(OH)_2$,
   (b) dewatering the precipitated calcium carbonate seeds prepared in step (a) in a tube press at a pressure in the range of 50 to 150 bar to obtain dewatered precipitated calcium carbonate seeds, and dispersing the dewatered precipitated calcium carbonate seeds so obtained in water to obtain an aqueous suspension of precipitated calcium carbonate seeds having a $d_{50}$ of less than or equal to 0.1 to 0.3 µm and a BET specific surface area of 10 to 30 $m^2/g$, and a pH of less than or equal to 9, wherein step (b) is conducted without grinding, and
   (c) forming an aqueous suspension of a precipitated calcium carbonate product by carbonating a slurry of $Ca(OH)_2$ in the presence of 0.5 to 5% by dry weight of the aqueous suspension of precipitated calcium carbonate seeds obtained in step (b),
   wherein the precipitated calcium carbonate seeds have a $d_{50}$ that is less than the $d_{50}$ of the precipitated calcium carbonate product and the precipitated calcium carbonate seeds have an aragonitic polymorph content greater than or equal to the precipitated calcium carbonate product obtained in step (c), and wherein the precipitated calcium carbonate product obtained in step (c) has a total strontium quantity of 0.2 to 15 mol/dry metric tonne.

15. The material according to claim 14, wherein the process further comprises the step of performing one or more of dewatering and dispersion of the precipitated calcium carbonate product obtained in step (c) to obtain a precipitated calcium carbonate product having a $d_{50}$ of between 0.30 and 0.45 micrometers and a BET specific surface area of between 8 and 20 $m^2/g$.

16. The material according to claim 14, wherein the precipitated calcium carbonate product obtained in step (c) has a total strontium quantity of 1 to 5 mol/dry metric tonne.

17. The material according to claim 14, wherein the precipitated calcium carbonate product obtained in step (c) contains an aragonitic polymorph content of greater than 60% by dry weight.

18. The material according to claim 14, wherein the precipitated calcium carbonate product obtained in step (c) contains an aragonitic polymorph content of greater than 70% by dry weight.

19. The material of claim 14, which is selected from the group consisting of a paper, a paper product, an ink, a paint, a coating, a plastic, an adhesive, a building product, a foodstuff, and a pharmaceutical product.

* * * * *